United States Patent
Rossi et al.

(10) Patent No.: US 8,847,607 B2
(45) Date of Patent: Sep. 30, 2014

(54) DEVICE FOR PROTECTING A CONNECTOR AND A COMMUNICATIONS WIRE OF A MEMORY CARD READER

(75) Inventors: Laurent Rossi, Dreux (FR); Bernard Schang, Le Mesnil Saint Denis (FR)

(73) Assignee: Compagnie Industrielle et Financiere d'Ingenierie "Ingenico", Neuilly-sur-Seine (FR)

( * ) Notice: Subject to any disclaimer, the term of this patent is extended or adjusted under 35 U.S.C. 154(b) by 260 days.

(21) Appl. No.: 13/233,567

(22) Filed: Sep. 15, 2011

(65) Prior Publication Data

US 2012/0062241 A1 Mar. 15, 2012

(30) Foreign Application Priority Data

Sep. 15, 2010 (FR) ..................... 10 57383

(51) Int. Cl.
| | | |
|---|---|---|
| *G01R 35/00* | (2006.01) | |
| *G01R 27/26* | (2006.01) | |
| *G06K 7/00* | (2006.01) | |
| *G07F 19/00* | (2006.01) | |

(52) U.S. Cl.
CPC ............ *G06K 7/0013* (2013.01); *G06K 7/0047* (2013.01); *G06K 7/0091* (2013.01); *G07F 19/2055* (2013.01); *G06K 7/0021* (2013.01)
USPC ........... 324/601; 324/686; 340/541; 340/550; 713/194

(58) Field of Classification Search
None
See application file for complete search history.

(56) References Cited

U.S. PATENT DOCUMENTS

| | | | |
|---|---|---|---|
| 5,446,391 A | 8/1995 | Aoki et al. | |
| 6,390,367 B1 | 5/2002 | Doig | |
| 6,853,093 B2 * | 2/2005 | Cohen et al. | 257/678 |
| 6,983,378 B1 | 1/2006 | Kokubo | |
| 7,015,823 B1 | 3/2006 | Gillen et al. | |
| 7,024,565 B1 * | 4/2006 | Beiley et al. | 713/194 |
| 2007/0295810 A1 | 12/2007 | Hopt et al. | |
| 2007/0296709 A1 | 12/2007 | GuangHai | |
| 2008/0278355 A1 | 11/2008 | Moore et al. | |

(Continued)

FOREIGN PATENT DOCUMENTS

| | | |
|---|---|---|
| EP | 1804557 A1 | 7/2007 |
| EP | 1873680 A1 | 1/2008 |

(Continued)

OTHER PUBLICATIONS

Analog Devices AD7142 Data Sheet, 2007, Analog Devices Inc., p. 1.*

(Continued)

*Primary Examiner* — Melissa Koval
*Assistant Examiner* — Stephen G Armstrong
(74) *Attorney, Agent, or Firm* — David D. Brush; Westman, Champlin & Koehler, P.A.

(57) ABSTRACT

A device is provided for protecting an electronic payment terminal that includes an electronic printed circuit board and a casing. The device includes at least one capacitive detector in a volume formed by a first ground plane of the printed circuit and a second ground plane positioned on an internal surface of the casing, the at least one capacitive detector being configured to deliver a reference capacitance. A capacitive measurement microprocessor detects a variation of capacitance of the at least one capacitive detector. A transmitter transmits the variation when an absolute value of a difference between the reference capacitance and the measured capacitance exceeds a predetermined threshold.

10 Claims, 4 Drawing Sheets

(56) References Cited

U.S. PATENT DOCUMENTS

| | | |
|---|---|---|
| 2009/0058628 A1 | 3/2009 | Kirmayer |
| 2009/0271004 A1 | 10/2009 | Zecchin et al. |
| 2010/0090714 A1* | 4/2010 | Van Geloven et al. ........ 324/705 |
| 2011/0095919 A1 | 4/2011 | Ostermoller et al. |

FOREIGN PATENT DOCUMENTS

| | | |
|---|---|---|
| EP | 1927931 A1 | 6/2008 |
| EP | 2109058 A1 | 10/2009 |
| FR | 2857113 A1 | 1/2005 |
| WO | 2009103594 A1 | 8/2009 |
| WO | 2010007314 A2 | 1/2010 |

OTHER PUBLICATIONS

Machine English translation of WIPO Patent Application Publication to Inventor Pierre Lacroix. WO 2010/007314 A2, Jan. 21, 2010. Translation of pp. 1-15 created on Aug. 11, 2013.*

French Search Report dated May 24, 2011 for corresponding French Application No. FR1057387, filed Sep. 15, 2010.

French Search Report dated May 18, 2011 for corresponding French Application No. FR1057385, filed Sep. 15, 2010.

French Search Report dated Aug. 12, 2011 for corresponding French Application No. FR1057383, filed Sep. 15, 2010.

French Search Report dated May 17, 2011 for corresponding French Application No. FR1057381, filed Sep. 15, 2010.

Office Action dated Jan. 14, 2013 for corresponding U.S. Appl. No. 13/233,573, filed Sep. 15, 2011.

Notice of Allowance dated Jun. 21, 2013 from the United States Patent and Trademark Office for corresponding U.S. Appl. No. 13/233,573, filed Sep. 15, 2011.

Office Action dated Oct. 24, 2013 from the United States Patent and Trademark Office for corresponding U.S. Appl. No. 13/233,601, filed Sep. 15, 2011.

Office Action dated Aug. 13, 2013 from the United States Patent and Trademark Office for corresponding U.S. Appl. No. 13/233,597, filed Sep. 15, 2011.

Advisory Action dated Jul. 25, 2014 for U.S. Appl. No. 13/233,597, filed Sep. 15, 2011.

Notice of Allowance dated Jul. 22, 2014 for U.S. Appl. No. 13/233,601, filed Sep. 15, 2011.

* cited by examiner

DEVICE FOR PROTECTING A CONNECTOR AND A COMMUNICATIONS WIRE OF A MEMORY CARD READER

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the field of the protection of memory card readers comprising a memory card (MC) connector. Memory card readers are used especially in many apparatuses such as payment terminals, authentication or identification devices, or again content-reading devices.

The present disclosure pertains more particularly to the securing of a connector and the securing of a communications link of such memory card readers in order to protect them against all intrusion by malicious third parties.

BACKGROUND OF THE DISCLOSURE

Apparatuses integrating memory card readers such as electronic payment terminals (EPTs) and automatic teller machines (ATMs) are a key element in measures taken to ensure securing electronic payments by users.

Indeed, electronic payment terminals are used to set up a link between the payment card and its holder, between the supplier and the network. Furthermore, they record the transaction.

Automatic cash dispensers are used to withdraw bank notes after the holder has been identified. They are routinely connected to the data-processing centre of the card-issuing banks during each transaction. Credit institutions are responsible for their operation.

These payment terminals comprise many securing devices and implement many methods to ensure that the apparatuses are employed in compliance with the use for which they were designed and that they meet the security standards laid down by certification organizations.

For example, in the field of electronic payment terminals (EPTs), the manufacturers are required, since Jan. 1, 2008, to comply with the PCI PED 2.0 (Payment Card Industry Pin Entry Device) standard.

This security standard consists especially in securing the entry keypad of the terminals by protecting the entry of the confidential code, and blocking the terminal in the event of intrusion (whether fraudulent or accidental).

However experience shows that, apart from the securing of the keypad, there is a problem in that making payment terminals available at sales points gives malicious third parties relatively easy access to these payment terminals. One recently observed fraudulent practice is that of snooping on confidential data in the input/output communications link commonly known as the "MC_IO" (Memory Card Input/Output) link. The term "inputs/outputs" also designates information exchanges between the processor of the payment terminal and the peripherals associated with it. This input/output communications link is directly connected to the memory card connector of the payment terminal.

In January 2010, Professor Ross Anderson of Cambridge University, a specialist in IT security engineering, made the headlines in the matter of data securing. He had discovered a way to falsify the interaction between a card and a payment terminal so as to trick the latter into believing that the cardholder had keyed in his code.

Thus, a novel form of fraud is that of the insertion into the payment terminal of a decoy making the payment terminal believe that the bank card holder has well and truly keyed in his or her confidential code. Such a fraudulent practice corresponds concretely to the insertion of a micro-bug or a software anomaly into the slot used to insert the payment card connector.

A bug of this kind can take various forms. For example, the bug may be an electronic micro-assembly used to snoop on transactional data between the payment card and the payment terminal. The bug may also correspond to a simple link inserted into the memory card connector, linking the input/output communications link of the payment terminal to an external assembly designed to snoop or perform any other form of malicious action against a user's bank data.

In order to protect the input/output link and the memory card connector, protection solutions have been developed. These solutions are of the "electromechanical" type implementing for example a flexible wire mesh or again a lattice of links on which voltage tests are performed for example.

These costly solutions are aimed explicitly at preventing access by an malicious third party to the input/output links and to memory card connectors.

In general, several wire meshes or lattices of links are associated in parallel to protect the MC_IO input/output link. A lattice of links implanted in one of the internal layers of the PCB (printed circuit board) can be used to protect the bottom side of the "MC" connector, while wire mesh (a flexible wire mesh having adjacent tracks covering the surface area to be protected) will be placed on the top side of the connector. And a third device (an IO cache) can be deployed in a position just facing the connection pins linking the connector to the PCB. This latter device is a mini-printed-circuit in which the lattice of links is implanted, the entire unit being connected (soldered) to the main printed circuit board so as to obtain a "mini-wall" between the connection pins and the slot for inserting the connector.

These various devices are tested on voltage levels or signals.

The drawback of these solutions lies in the fact that the wire mesh, by its nature, has holes which enable possible intrusion into the memory card connector or again possible deterioration of the input/output link.

Thus, to date, the inventors have not identified any simple and low-cost solution enabling protection as well as efficient surveillance of the input/output link and of the memory card connector against any intrusion by malicious third parties.

SUMMARY

An exemplary embodiment of the invention does not have these drawbacks of the prior art.

An embodiment of the invention pertains to a device for protecting an electronic payment terminal comprising an electronic printed circuit board and a casing.

According to an embodiment of the invention, such a protection device comprises:

at least one capacitive detector positioned in a volume formed by a first ground plane of said printed circuit and a second ground plane positioned on an internal surface of said casing, said at least one capacitive detector being configured to deliver a reference capacitance;

a capacitive measurement microprocessor electrically connected to said at least one capacitive detector, said at least one microprocessor being configured to detect a variation of capacitance of said at least one capacitive detector;

means for transmitting a piece of information representing said variation of capacitance when an absolute value of a difference between said measured capacitance and said reference capacitance exceeds a predetermined threshold.

According to one particular characteristic of an embodiment of the invention, said protection device uses an existing detector (wire mesh) and performs a measurement of capacitance on said detector.

According to one particular embodiment, said protection device further comprises calibration means delivering said reference capacitance.

According to one particular embodiment, said protection device further comprises a system of environmental compensation modifying said reference capacitance as a function of a predetermined criterion.

According to one particular characteristic, said at least one capacitive detector, called a first capacitive detector, is positioned on a memory card connector.

According to one particular characteristic, the protection device further comprises a second capacitive detector connected to an input/output link of the memory card connector.

According to one particular embodiment, said first capacitive detector is a square spiral shaped copper track.

According to one other particular embodiment, said first capacitive detector is deployed in a full plane.

According to another aspect, an embodiment of the invention also pertains to a method for protecting an electronic payment terminal comprising an electronic printed circuit board and a casing. According to an embodiment of the invention, said protection method comprises:

a step for positioning at least one capacitive detector in a volume formed by a first ground plane of said printed circuit and a second ground plane positioned on an internal surface of said casing, said at least one capacitive detector being configured to deliver a reference capacitance;

a capacitive measurement step implemented by a capacitive measurement microprocessor electrically connected to said at least one capacitive detector, said at least one microprocessor being configured to detect a variation of capacitance of said at least one capacitive detector;

a step for transmitting a piece of information representing said variation of capacitance when an absolute value of a difference between said measured capacitance and said reference capacitance exceeds a predetermined threshold.

According to one particular characteristic, said protection method also comprises a calibration step delivering said reference capacitance.

According to another aspect, an embodiment of the invention also pertains to a payment terminal. According to an embodiment of the invention, such a payment terminal comprises a protection device as previously described.

According to another aspect, an embodiment of the invention also pertains to a computer program comprising program code instructions recorded on a non-transitory computer readable memory to implement the protection method when the program is executed by a processor.

BRIEF DESCRIPTION OF THE DRAWINGS

Other features and advantages should appear more clearly from the following description of a preferred embodiment, given by way of a simple, illustrative and non-exhaustive example and from the appended drawings, of which.

DETAILED DESCRIPTION OF ILLUSTRATIVE EMBODIMENTS

1. Reminder of the Principle of an Embodiment of the Invention

An embodiment of the invention proposes to provide simple and efficient surveillance of the input/output link and of the memory card connector against any intrusion by malicious third parties by using protection devices implementing a capacitive measurement of at least one capacitive detector positioned on the memory card connector of a payment terminal.

Since the protection device implements a capacitive measurement, an intrusion of a conductive element is detected because the intrusion modifies the magnetic field lines, and therefore modifies the reference capacitance of the capacitive detector beyond a predetermined threshold.

According to an embodiment of the invention, a device for protecting a payment terminal includes a capacitive detector introduced into a volume formed by a first ground plane resting on the surface of the printed circuit of the payment terminal, and a second ground plane positioned at the bottom of the plastic casing of the payment terminal, a capacitive measurement microprocessor and a transmitter for transmitting a piece of information reporting a variation of the capacitance of the capacitive detector beyond a predetermined threshold, in other words reporting an intrusion into the volume under surveillance.

According to a first embodiment of the invention, a first capacitive detector is deployed on a memory card connector of the payment terminal.

According to another embodiment, a second capacitive detector is added to the protection device and linked to an input/output link of the memory card connector.

According to an embodiment of the invention, the protection device is capable of protecting a payment terminal by capacitive measurement. Such a protection device can take any shape whatsoever. The shape of the device can be adapted to the casing, or again to the memory card connector to be connected.

Here below, a detailed description is provided of one embodiment of a protection device according to the invention. It is clear however that the invention is not limited to this particular application but can also be implemented in many other contexts of protection of electronic printed circuit boards, and more generally in any case where the characteristics listed here below are useful.

1.1 General Structure of a Device According to an Embodiment of the Invention

Figure 1:
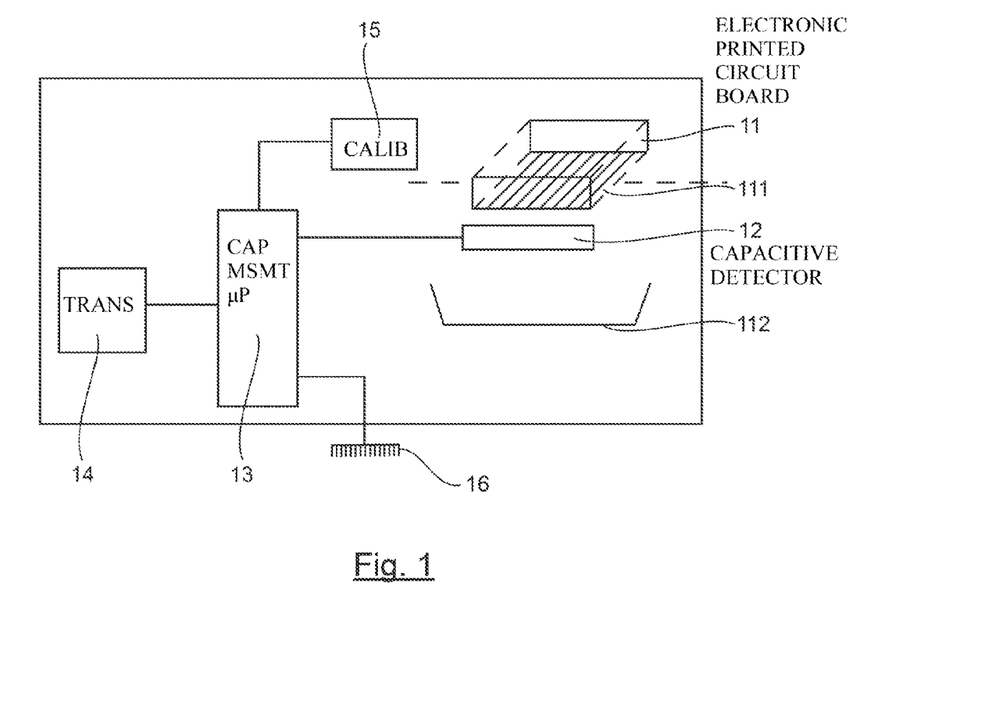
FIG. 1 is a drawing of a protection device according to an embodiment of the invention.

Referring to FIG. 1, we present the general structure of a protection device 10 according to an embodiment of the invention. Such a device comprises first of all a capacitive detector 12 belonging to a volume defined by a first ground plane 111 of an electronic printed circuit 11 and a second ground plane of a printed circuit 112 positioned at the bottom of the casing of the payment terminal.

These ground planes produce an action comparable to that of a Faraday cage, i.e. they protect the protection device from external electromagnetic disturbances if any.

The ground plane positioned at the bottom of the casing of payment terminal is obtained for example by a known method for applying conductive paint.

Besides, the calibration circuit 15, which is electrically connected to the capacitive detector, enable its reference capacitance to be evaluated. The calibration circuit 15 shall be described in further detail here below.

Furthermore, the protection device according to an embodiment of the invention also includes a capacitive measurement microprocessor 13 electrically connected to the capacitive detector 12 and to the ground 16. A measurement microprocessor of this kind uses for example a capacitive sensor corresponding to a probe to measure the capacitance of the capacitive detector.

Such a probe is generally made with a flat measurement electrode surrounded by a guard ring. The electrode then, along with the capacitive detector, forms a flat capacitor. A guard electrode contained in the guard ring is placed around the measurement electrode and its potential is carried to the same value in order to improve linearity, by making the field lines normal (i.e. perpendicular) to the measurement electrode. The guard electrode thus eliminates edge effects.

Through the measurement means (microprocessor or other circuit) 13, a variation is detected in the capacitance of the capacitive detector. This variation is obtained for example by comparing the measured capacitance with the reference capacitance preliminarily determined by the calibration circuit 15. This measurement is preferably done in real time so that the secured processor of a payment terminal is instantaneously alerted through transmitter 14.

Independently of the measurement frequency selected by the user, all the measurements are driven by a computer program recorded within the measurement means.

More specifically, the measurement microprocessor determines a difference between the capacitance of the capacitive detector measured by the measurement microprocessor 13 and the reference capacitance determined by the calibration circuit. If the absolute value of this difference exceeds a predetermined threshold S, the transmitter of the protection device according to an embodiment of the invention tells the secured processor of the secured terminal to go into "attack" mode.

Thus, the protection device according to an embodiment of the invention is used to determine any contact with the capacitive detector placed in a volume defined by the ground plane 111 of the electronic printed circuit board 11 and by the second ground plane 112 positioned at the bottom of the casing of the payment terminal to be protected. In particular, any intrusion (even without direct contact with the sensor) by a malicious third party will be detected, because this intrusion, especially through the introduction of a conductive element, significantly modifies the capacitance of the capacitive detector.

Furthermore, this protection device makes use of the capacitive detector and of the capacitive measurement by avoiding implementation of a complex geometrical routing or again by avoiding the use of a protective hardware which can easily deteriorate and is costly, for example flexible wire mesh.

1.2 Calibrating the Considered Capacitive Detector

The calibration implemented by the calibration means (such as a circuit) 15 is needed because the value of the capacitance is sensitive to external variations.

Indeed, it is known that the value of the capacitance varies according to different factors. For example, the capacitance of a capacitive detector varies as a function of the charge hysteresis due to the magnetizing of a material, the effect of a battery of the payment terminal, or again the temperature, humidity, aging especially by oxidation of the materials constituting the capacitive detector, etc.

Figure 2:
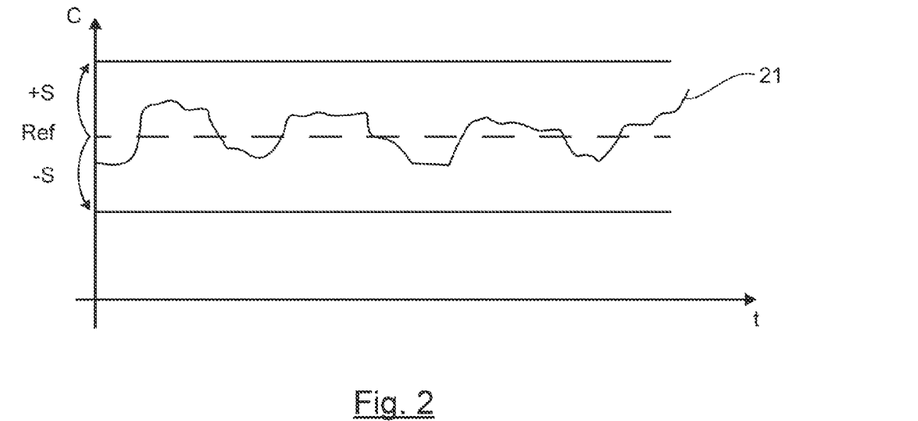
FIG. 2 shows curves of calibration of the protection device according to an embodiment of the invention.

FIG. 2, representing an example of calibration curves of the protection device according to an embodiment of the invention, represents the procedure implemented by the calibration circuit delivering the reference capacitance of the capacitive detector.

The calibration circuit measures 21 (for example similarly to the method used by the previously described measuring microprocessor) the capacitance of the capacitive detector as a function of time. The measurement curves 21 shown in FIG. 2 attests to the fact that the capacitance varies according to time, especially as a function of the ambient temperature.

The calibration circuit takes the average of the capacitance measurement data on the measurement curve so that a reference value Ref is obtained.

Furthermore, the calibration circuit determines for example a capacitance variation threshold S beyond which the variation in capacitance is abnormal. Thus, the calibration circuit determines the range of values of capacitance centered on the reference value making it possible to attest to "normal" and secured operation of the printed circuit board of the payment terminal.

Preferably, the reference value and the predetermined threshold S are recorded in a memory and transmitted to the measurement microprocessor so the microprocessor determines an intrusion by a malicious third party aiming at damaging the electronic printed circuit board.

Optionally, the calibration circuit furthermore includes a system of environmental compensation aimed at adapting the reference values and the predetermined threshold S as a function of a parameter selected by the user of the payment terminal.

For example, since the ambient temperature in Singapore is very different from the temperature in Stockholm, the user will adapt the capacitance reference and the authorized range of capacitance variation to the location.

Similarly, in another example, the user may adapt this range of variation as and when the payment terminal ages, according to the manufacturer's recommendations set forth in a user's instruction sheet.

2. Description of a First Embodiment of a Device According to the Invention 2.1 Structure of the Protection Device According to this First Embodiment In this embodiment, represented by FIGS. 3A to 3D, we present a protection device according to a first embodiment of the invention in which a first capacitive detector is mounted on the memory card connector shown in FIG. 3A.

Figure 3A:
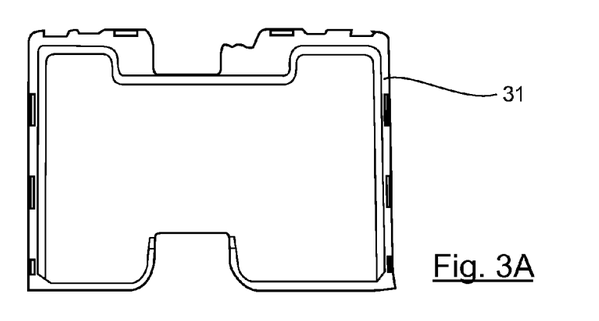
FIGS. 3A to 3D present the layout and working of a capacitive detector on a memory card connector, as well as two variants of capacitive detectors.

The first capacitive detector placed on the memory card connector measures the capacitance of the volume defined by a first ground plane 111 of an electronic printed circuit board 11 and a second ground plane 112 positioned at the bottom of the casing of the payment terminal.

Figure 3B:
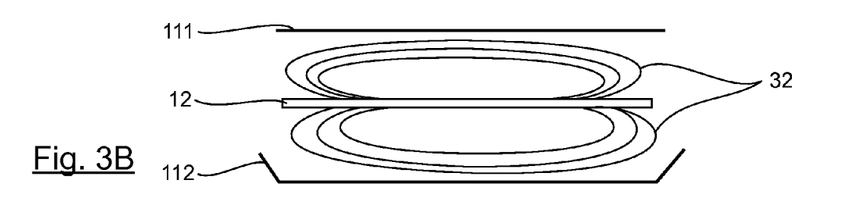

Thus, any insertion of an object, even very small, formed by one or more conductive parts, between the capacitive detector and one of the ground planes (defining the volume containing the capacitive detector) modifies the field lines 32 shown in FIG. 3B.

This modification of field lines leads to a variation of the capacitance of the volume beyond the predetermined threshold defined previously by the calibration circuit.

2.2 Type of Capacitive Detector

Figure 3C:
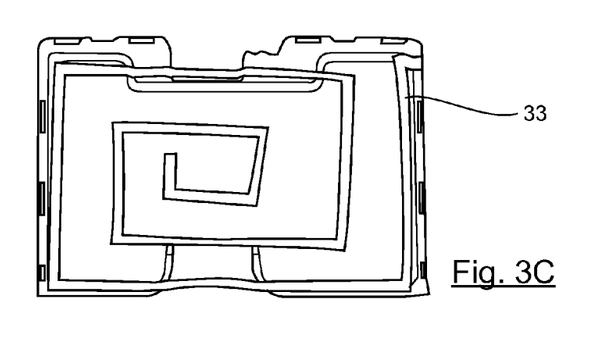

A capacitive detector taking the form of a simple copper track is used for example and shown in FIG. 3C. This track takes for example the shape of a square spiral 33.

Figure 3D:
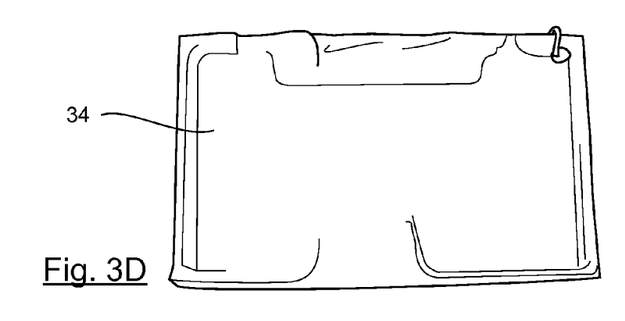

According to another variant, the detector 12 corresponds to a full plane 34 and is positioned on a surface of the memory card connector of the payment terminal for example.

A capacitive detector corresponding to a full plane takes the form of a capacitive surface. More specifically, a capacitive surface technology consists of a uniform conductive coating on an insulator. During use, electrodes placed on the edge of the insulator distribute a low-voltage current equally throughout the conductive layer, thus creating a uniform electric field. When an object comes into contact with the surface, it has the effect of attracting the current from each corner of the electrical field.

Optionally, a controller computes the coordinates of the contact by measuring the current. It then transmits these coordinates to the secured processor of the payment terminal.

In another embodiment, the capacitive detector may take the form of a lattice (not shown) of very fine (smaller than 10 μm) conductive wires buried between layers of insulator, for example glass or laminated plastic films.

A lattice of this kind may be plane or three-dimensional with a mesh of greater or lesser density. A single wire, positioned in a particular way, may also be sufficient in certain examples.

Furthermore, the protection device of an embodiment of the invention can also be electrically connected to a printed circuit board having an existing capacitive detector constituted by a conductive part and an insulator part. In this case, the protection device of an embodiment of the invention has electrodes placed on the edge of the insulator in order to distribute a low-voltage current equally throughout the whole conductive part, thus creating a uniform electrical field. The existing detector is thus made capacitive.

3. Description of a Second Embodiment of a Device According to the Invention

Figure 4A:
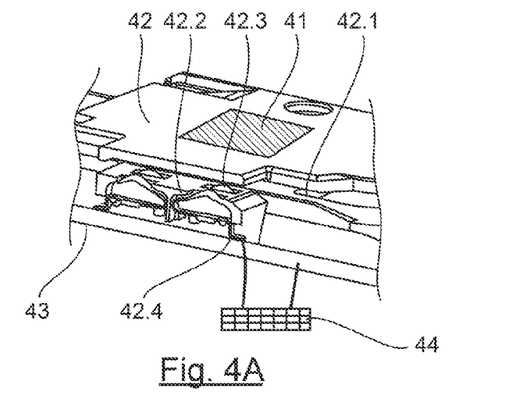
FIGS. 4A and 4B respectively present the drawing of a second embodiment of the invention and the electronic structure of the second associated capacitive detector.

Referring to FIG. 4A, we present the drawing of a second embodiment of the invention. This second embodiment, in addition to the first capacitive detector 41 placed on the memory card connector, adds a second capacitive detector in order to prohibit access to the links of the memory card connector, especially the MC_IO link (memory card input/output link).

As illustrated in FIG. 4A, the memory card connector 42 is mounted on the printed circuit board 43. The memory card connector has a slot 42.1 into which the card can be inserted. The memory card connector also has a set of links 42.2 enabling a connection of the card, once inserted, with a processor of the apparatus.

These links 42.2 have a slight bulge 42.3 in the zone of connection with the card, within the memory card connector. The links are then easily shaped so that they stretch towards the printed circuit board 43. They meet this printed circuit board at an intermediate zone in which the links 42.4 are connected to the printed circuit board 43.

The second capacitive detector 44 is laid out so that it prevents access to at least certain links and especially to the MC_IO link.

Figure 4B:
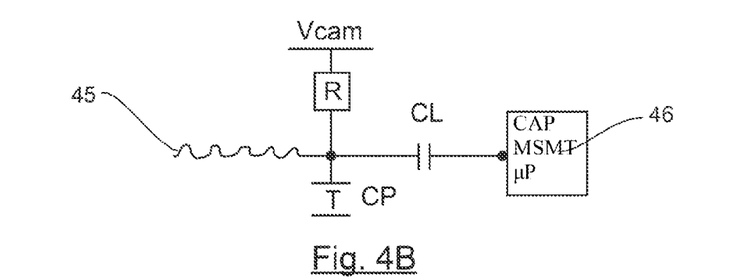

An electronic structure of the second capacitive device is shown with reference to FIG. 4B. In this structure, a linking capacitor CL implements a capacitive coupling making it possible to evaluate the capacitance of the MC_IO link 45. Furthermore, this detector is powered with a nominal voltage Vcam and also comprises a resistor R and a stray capacitance CP.

Vcam and R depend on the terminal and more particularly on the EMV standards and are present in all payment terminals. The linking capacitance CL is directly related to an embodiment of the invention, it has a value of 220 pF (by way of an indication) and this value can vary as a function of the dimensions of the tracks.

4. Description of an Embodiment of the Method of Protection According to the Invention Referring to FIG. 5, we present the method 50 for protecting an electronic printed circuit board according to an embodiment of the invention.

Figure 5:
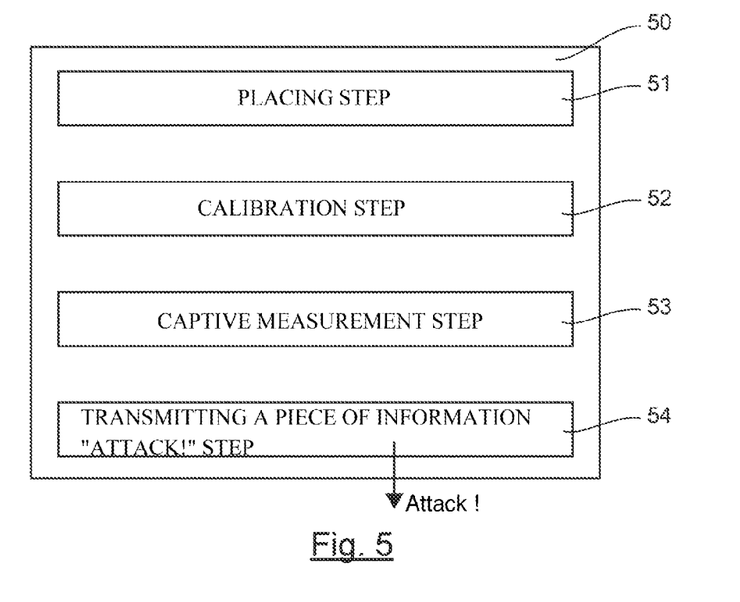
FIG. 5 illustrates the method of protection according to an embodiment of the invention.

Such a method comprises a step 51 for placing at least one capacitive detector 41 on a layer of the printed circuit board of the payment terminal, a calibration step 52 delivering the reference capacitance of the capacitive detector, a step 53 of capacitive measurement implemented by a capacitive measurement microprocessor 46 electrically linked to the capacitive detector 44, the microprocessor 46 being configured to detect a variation in capacitance of the capacitive detector, a step 54 for transmitting a piece of information "Attack!" representing the variation in capacitance when an absolute value of a difference between the measured capacitance and the reference capacitance exceeds a predetermined threshold.

Furthermore, a calibration step could be reiterated for a procedure of utilization known by the user.

According to one particular embodiment, the calibration step furthermore comprises a step of environmental compensation aimed at taking into account the natural influence of certain parameters such as: the charge hysteresis due to the magnetization of a material, the effect of a battery of the payment terminal, or again the temperature, humidity, aging especially by oxidation of the materials constituting the capacitive detector, etc.

The protection method implemented by a protection device compliant with the second embodiment described here above, implements two capacitive detectors, one being placed on the memory card connector and one being connected to the input/output link of the memory card connector. The steps of the method described here above are therefore performed for each capacitive detector implemented.

Figure 6:
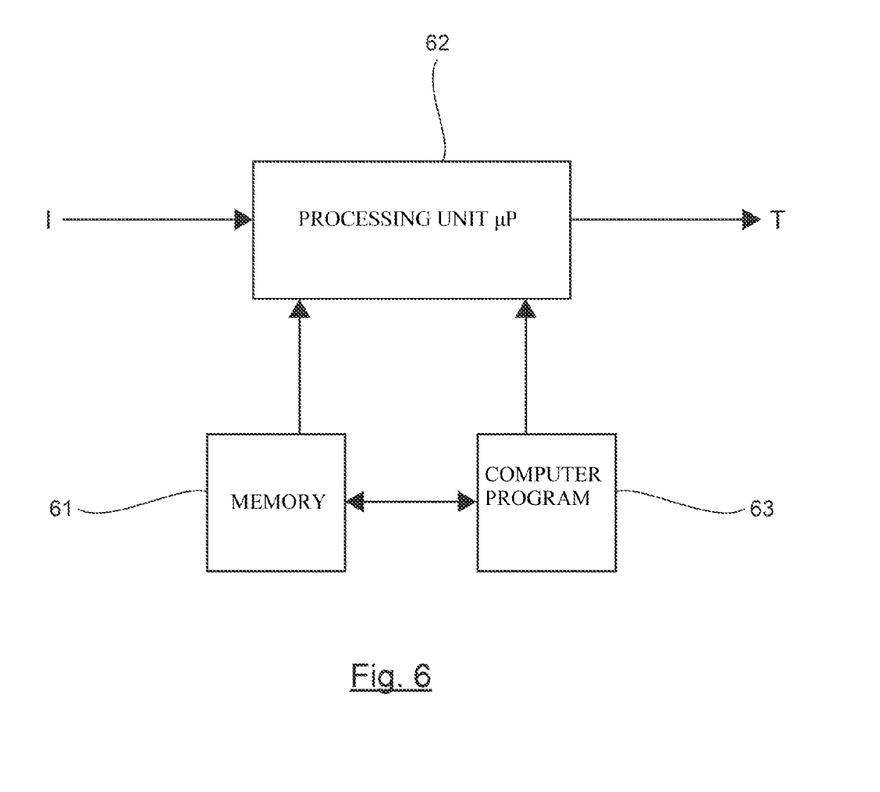
FIG. 6 is a schematic view of a payment terminal according to an embodiment of the invention.

Referring now to FIG. 6, we present an embodiment of a payment terminal according to an embodiment of the invention.

Such a terminal comprises a memory 61 constituted by a buffer memory, a processing unit 62, equipped for example with a microprocessor P, and driven by the computer program 63 implementing the method of protection according to an embodiment of the invention.

At initialization, the code instructions of the computer program 63 are loaded for example into a RAM and then executed by the processor of the processing unit 62. The processing unit 62 inputs at least one piece of information I, such as the location zone identifiers. The microprocessor of the processing unit 62 implements the steps of the protection method described here above, according to the instructions of the computer program 63 to deliver a piece of processed information T such as the detection of an attack leading to the elimination of the protected data. To this end, in addition to the buffer memory 61, the terminal comprises at least one capacitive detector placed in a volume formed by a first ground plane of said printed circuit and a second ground plane positioned on an internal surface of said casing, said at least one capacitive detector being configured to deliver a reference capacitance, a capacitive measurement microprocessor electrically connected to said at least one capacitive detector, said at least one microprocessor being configured to detect a variation in capacitance of said at least one capacitive detector, a transmitter for transmitting a piece of information representing said variation in capacitance, when an absolute value of a difference between said measured capacitance and said reference capacitance exceeds a predetermined threshold.

These elements are driven by the microprocessor of the processing unit 62.

Although the present disclosure has been described with reference to one or more examples, workers skilled in the art will recognize that changes may be made in form and detail without departing from the scope of the disclosure and/or the appended claims.

The invention claimed is:

1. A device for protecting an electronic payment terminal, the device comprising:
   an electronic printed circuit board having a surface;
   a casing having an internal surface at a bottom of said casing;
   at least one capacitive detector positioned in a volume formed by a first ground plane corresponding to a surface resting on the surface of said printed circuit and a second ground plane corresponding to a surface resting on the internal surface at the bottom of said casing, said second ground plane being solid or a conductive paint, and said at least one capacitive detector being configured to deliver a reference capacitance of said volume;
   a capacitive measurement microprocessor electrically connected to said at least one capacitive detector, said at least one microprocessor being configured to detect a variation of capacitance of said at least one capacitive detector, said variation of capacitance corresponding to a variation of capacitance in said volume due to any insertion of an object, formed by one or more conductive parts, between said capacitive detector and one of the ground planes defining the volume containing the capacitive detector, said insertion modifying magnetic field lines between the first and second ground planes; and
   a transmitter configured for transmitting a piece of information representing said variation of capacitance when an absolute value of a difference between said measured capacitance and said reference capacitance exceeds a predetermined threshold.

2. The device for protecting according to claim 1, wherein the device further comprises calibrator configured to deliver said reference capacitance.

3. The device for protecting according to claim 1, wherein said at least one capacitive detector, called a first capacitive detector, is positioned on a memory card connector.

4. The device for protecting according to claim 3, wherein the device further comprises a second capacitive detector connected to an input/output link of the memory card connector.

5. The device for protecting according to claim 1, wherein said capacitive detector comprises a square spiral shaped copper track.

6. The device for protecting according to claim 1, wherein said capacitive detector is deployed in a full plane.

7. A method for protecting an electronic payment terminal comprising an electronic printed circuit board and a casing, wherein said method for protecting comprises:
   a step of positioning at least one capacitive detector in a volume formed by a first ground plane corresponding to a surface resting on a surface of said printed circuit and a second ground plane corresponding to a surface resting on an internal surface at a bottom of said casing, said second ground plane being solid or a conductive paint, and said at least one capacitive detector being configured to deliver a reference capacitance of said volume;
   a capacitive measurement step implemented by a capacitive measurement microprocessor electrically connected to said at least one capacitive detector, said at least one microprocessor being configured to detect a variation of capacitance of said at least one capacitive detector, said variation of capacitance corresponding to a variation of capacitance in said volume due to any insertion of an object, formed by one or more conductive parts, between said capacitive detector and one of the ground planes defining the volume containing the capacitive detector, said insertion modifying magnetic field lines between the first and second ground planes; and
   a step of transmitting a piece of information representing said variation of capacitance when an absolute value of a difference between said measured capacitance and said reference capacitance exceeds a predetermined threshold.

8. The method for protecting according to claim 7, wherein the method further comprises a calibration step delivering said reference capacitance.

9. A payment terminal comprising:
   an electronic printed circuit board having a surface;
   a casing having an internal surface at a bottom of said casing; and
   a device for protecting the electronic payment terminal, said device comprising:
      at least one capacitive detector positioned in a volume formed by a first ground plane corresponding to a surface resting on the surface of said printed circuit and a second ground plane corresponding to a surface resting on the internal surface at the bottom of said casing, said second ground plane being solid or a conductive paint, and said at least one capacitive detector being configured to deliver a reference capacitance of said volume;
      a capacitive measurement microprocessor electrically connected to said at least one capacitive detector, said at least one microprocessor being configured to detect a variation of capacitance of said at least one capacitive detector, said variation of capacitance corresponding to a variation of capacitance in said volume due to any insertion of an object, formed by one or more conductive parts, between said capacitive detector and one of the ground planes defining the volume containing the capacitive detector, said insertion modifying magnetic field lines between the first and second ground planes; and a transmitter configured for transmitting a piece of information representing said variation of capacitance when an absolute value of a difference between said measured capacitance and said reference capacitance exceeds a predetermined threshold.

10. A computer program comprising program code instructions recorded on a non-transitory computer readable memory to implement a method for protecting an electronic payment terminal comprising an electronic printed circuit board and a casing, when the program is executed by a processor, wherein the method comprises:

a capacitive measurement step implemented by a capacitive measurement microprocessor electrically connected to at least one capacitive detector, said at least one capacitive detector being positioned in a volume formed by a first ground plane corresponding to a surface resting on a surface of said printed circuit and a second ground plane corresponding to a surface resting on an internal surface at a bottom of said casing, said second ground plane being solid or a conductive paint, and said at least one capacitive detector being configured to deliver a reference capacitance of said volume, and said at least one microprocessor being configured to detect a variation of capacitance of said at least one capacitive detector, said variation of capacitance corresponding to a variation of capacitance in said volume due to any insertion of an object, formed by one or more conductive parts, between said capacitive detector and one of the ground planes defining the volume containing the capacitive detector, said insertion modifying magnetic field lines between the first and second ground planes; and a step of transmitting a piece of information representing said variation of capacitance when an absolute value of a difference between said measured capacitance and said reference capacitance exceeds a predetermined threshold.

* * * * *